United States Patent [19]

Propes

[11] Patent Number: 5,073,876
[45] Date of Patent: Dec. 17, 1991

[54] GEOPHYSICAL EXPLORATION USING NEAR SURFACE STRUCTURE CORRECTIONS DEVELOPED FROM COMMON ENDPOINT GATHER STACKED TRACES

[75] Inventor: Russell L. Propes, Houston, Tex.
[73] Assignee: Amoco Corporation, Chicago, Ill.
[21] Appl. No.: 636,641
[22] Filed: Dec. 31, 1990
[51] Int. Cl.[5] ............................................. G01V 1/36
[52] U.S. Cl. ..................................... 367/54; 367/36; 367/73
[58] Field of Search ....................... 367/36, 50, 54, 73

[56] References Cited

U.S. PATENT DOCUMENTS

| | | | |
|---|---|---|---|
| 3,629,798 | 12/1971 | Rockwell | 367/36 |
| 4,101,867 | 7/1978 | Martin | 367/54 |
| 4,498,157 | 2/1985 | Martin et al. | 367/50 |
| 4,528,649 | 7/1985 | Gassaway et al. | 367/36 |
| 4,695,984 | 9/1987 | Paal | 367/54 |

OTHER PUBLICATIONS

Farrell et al., "Refraction Statics," Proc. IEEE, vol. 72, #10, Oct. 1984.
Kearey et al., "Seismic Refraction Surveying" in an Introduction to Geophysical Exploration (London, 1984) pp. 74-79, 111-137.

Primary Examiner—Ian J. Lobo

[57] ABSTRACT

Weathering corrections are determined from first arrival times of refraction stacked traces of common end point gathers. The refraction stacked traces are generated by selecting traces having receiver source offsets greater than the crossover distance and stacking such traces over at least an interval comprising first arrival times. Optionally, a predictor function is used to select first arrivals and the first arrivals are selected from a refraction stacked trace section.

15 Claims, 10 Drawing Sheets

GEOPHYSICAL EXPLORATION USING NEAR SURFACE STRUCTURE CORRECTIONS DEVELOPED FROM COMMON ENDPOINT GATHER STACKED TRACES

FIELD OF THE INVENTION

The invention relates to the processing of multifold seismic traces. In a particular aspect, the invention relates to correcting seismic traces by removing effects of near surface structure.

SETTING OF THE INVENTION

Acquisition and processing of multifold traces has significantly improved quality of seismic sections. However, the first break intercept time method for removing effects of the weathering layer from multifold traces is processing and time intensive. New and effective techniques for removing the effects of weathering from multifold traces are needed.

In early years of seismic exploration, seismic sections were generated from seismic traces in which each point in the subsurface might be represented by only one seismic initiation received by one receiver (single fold trace acquisition). Multifold trace acquisition techniques provide a multiplicity of signals sampling each point in the subsurface and so improves the quality of resulting seismic sections that it is common today for seismic acquisitions to obtain one hundred fold or even more traces. An increase in the fold of traces, however, increases trace processing requirements. One area of resulting increased trace processing requirements is that of correcting seismic traces to remove effects of the weathering layer.

The weathering layer is a near surface low velocity layer of the earth, usually the portion where air rather than water fills the pore spaces of rocks and unconsolidated earth. Its thickness varies laterally and may bear little correlation with topographic variations. Seismic velocities in the weathering layer (weathering velocities) are typically in the range of 500-800 m per second compared to subweathering or refractor velocities of 1,500 m per second or greater. The area of interest to the petroleum explorationist is the part of the earth's subsurface beneath the weathering layer. A key step in the processing of seismic traces is removal of the effects of the weathering layer.

Generally, the process of removing weathering effects (statics correction) involves determining a seismic datum, sometimes referred to as a datum plane or a residual refractory surface, and then applying a time shift or datum correction to each seismic trace to produce traces as if sources and geophones had been located on the seismic datum plane and as if no low velocity or weathering layer existed. Thus, statics correction includes determining the datum correction or time required for a seismic signal to travel from a source to a seismic datum and from the seismic datum to the geophone. Each trace is then time shifted by this value to give arrival times connected to the seismic datum. The effect of this time shift is to replace the weathering velocity $V_0$ with the refractory velocity $V_1$ below the seismic datum.

Various methods, well known to those skilled in geophysical exploration and trace processing, are used to determine the datum correction depending on the seismic trace acquisition technique.

An early technique for removing the effects of the weathering layer was the first break intercept time method. According to this method, the intercept time resulting from extrapolating first breaks plotted as a function of offset in the traveltime-offset domain was and is used as a measure of zero offset traveltime. This measure of zero offset traveltime is then used to remove the effect of weathering from seismic signals.

As the use of multifold traces has expanded, various other techniques for removing weathering effects have been developed such as uphole based statics and data smoothing statics methods, including automatic statics determination programs employing statistical methods. However, the first break intercept time method is still highly significant because first break signals have a high signal to noise ratio and are readily identifiable in the traces.

In conventional processing using the first break time intercept method with multifold traces, however, typically a first break intercept time and datum correction is determined for each trace of the multifold set of traces. Therefore, the resulting trace processing requirements are large and increase with the fold of traces. Therefore, new and effective techniques for removing effects of weathering from multifold seismic traces are needed which provide the advantages of first break intercept time techniques but which are less time and computationally intensive.

SUMMARY OF THE INVENTION

The invention relates to removing weathering layer effects from multifold seismic traces. In summary, the method includes sorting multifold seismic traces obtained along a seismic line of exploration into common endpoint (CEP) gathers, that is, into common receiver point (CRP) or common shotpoint (CSP) gathers of traces. A set of traces in each of a plurality of CEP gathers at intervals along the seismic line is linear moveout corrected (LMO) and then stacked or summed at least over a travel-time interval encompassing first arrivals. Such stacked traces of CEP gathers are referred to as refraction stacked traces or refraction stacks. The first arrival times of the resulting refraction stacks are used to determine a measure of intercept time and to determine datum corrections for removing weathering layer effects from seismic traces.

The invention will be further understood and appreciated from the following description and from the drawings.

DESCRIPTION OF THE INVENTION

The invention relates to processing seismic traces for developing a near surface model and to generating surface consistent statics for correcting long wave length traveltime perturbations. The invention uses refraction stacks of CEP gathers to estimate intercept times for weathering correction.

In principle the process of long period statics correction is that of estimating the thickness and velocity of the weathering layer and using the estimated thickness to eliminate the effect of the weathering layer. The invention requires generating refraction stacked traces or a refraction stacked trace section or both and picking first arrivals from refraction stacked traces. Thus, there is a step of refraction stacking or summing prior to selecting first arrivals for determining datum corrections, and the picking of first arrivals is from only one stacked trace for each CEP gather.

In a common end point domain such as the common receiver domain or common shotpoint domain, the point of zero offset for a gather is also the receiver or source location. Hence by generating a refraction stack in accordance with the invention and using first arrival times represented in such refraction stacked traces, a measure of the intercept time is obtained.

The principle advantages are as follows: First, a significant time reduction of first arrival picking and statics computing is realized compared to picking first arrival times along many traces of each common receiver or common shotpoint record. Second, the method can be operated through an interactive platform and driven semiautomatically. See, for example, the discussion below of FIGS. 6-10. Results are comparable to those arrived at by traditional refraction statics while being much less time and computer usage intensive. Further, using common endpoint refraction stacks in accordance with the invention will typically reduce reflector smear as compared with using common midpoint refraction stacks, improving accuracy of intercept times along the profile.

Figure 1:
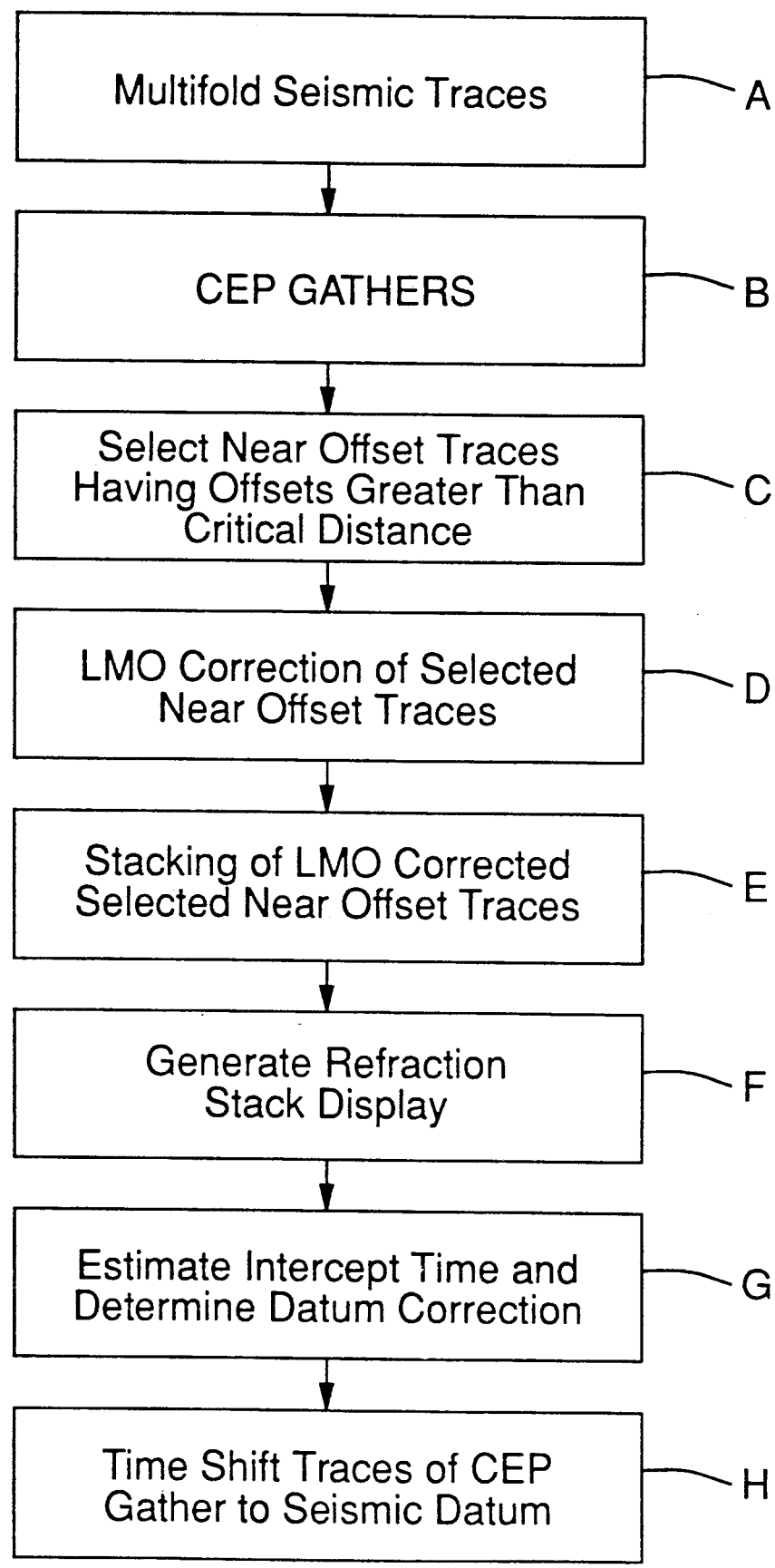
FIG. 1 illustrates a simplified flow chart of a first aspect of the invention.

Referring now to FIG. 1, as illustrated at A, the invention relates to processing multifold seismic traces. The traces can be acquired by any effective multifold seismic trace acquisition technique where multiple points in the subsurface are sampled by multiple seismic initiations received by multiple receivers, for example, the roll along method, and the like. In the roll along method receivers are spaced apart along the line of exploration and sources are initiated. Thereafter some of the receivers in the source location are moved or rolled along the seismic line and a new set of traces is recorded. Other multifold acquisition techniques can also be used. The advantage of using the invented technique for weathering corrections compared to other first break intercept time techniques increases with the number of fold of the seismic traces. The fold of the traces can broadly be 4- to 500-fold, advantageously in the range of 100-fold or more.

The seismic traces can be acquired using, for example, split spread reflection shooting, end-on spread reflection shooting, in-line offset spread reflection shooting, and the like. Where split spread traces are used, the traces can if desired be sorted into positive or negative sets prior to processing in accordance with the invention.

In multifold data acquisition, the result for each shot is a set of traces one for each receiver; and for a plurality of shots along the seismic line, a corresponding plurality of traces for each receiver.

As illustrated in FIG. 1 at B, in accordance with the invention, the resulting set of multifold traces is sorted into CEP gathers, that is, into common receiver gathers or into common shotpoint gathers.

Figure 2:
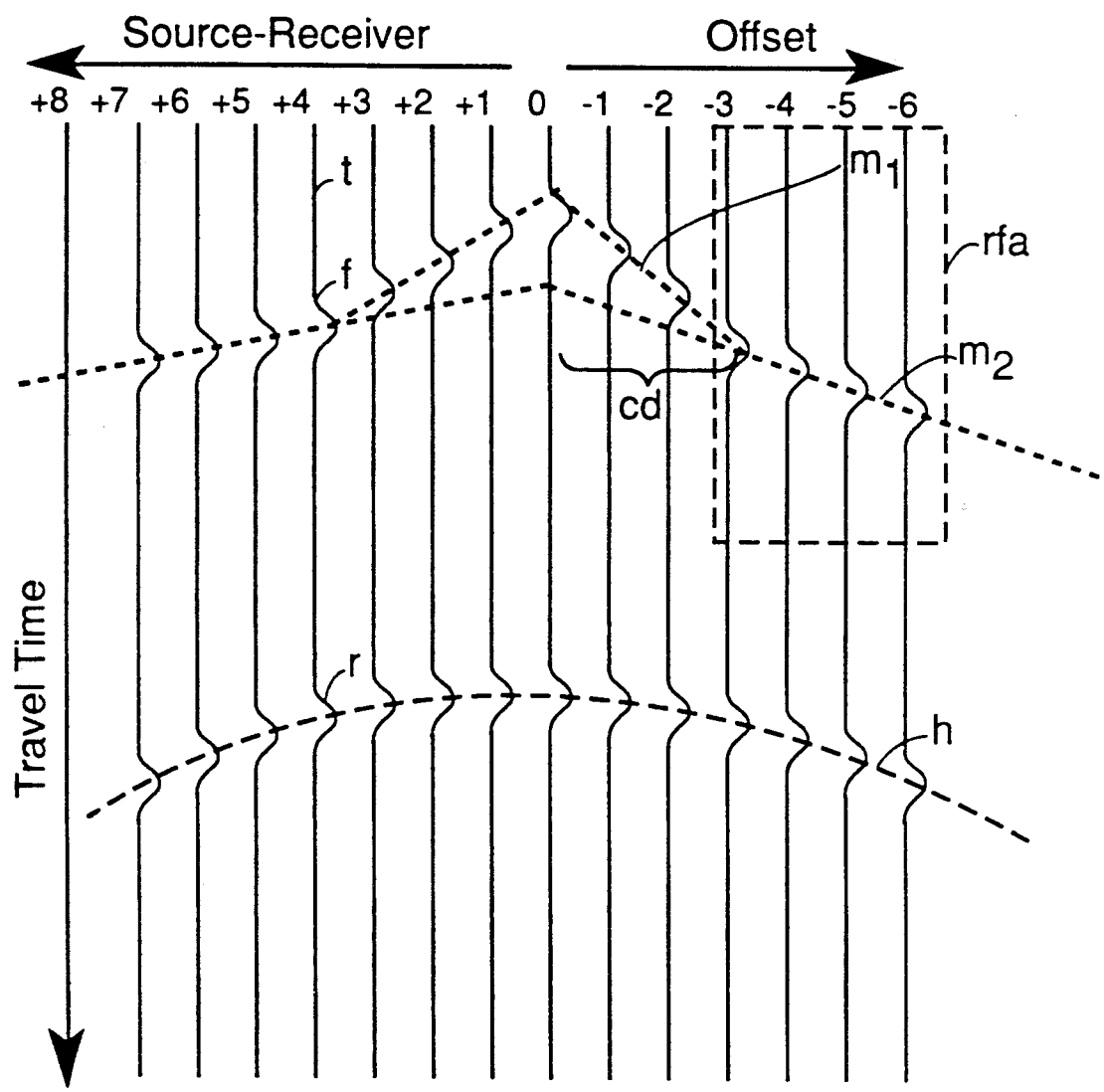
FIG. 2 illustrates schematically a common endpoint gather showing direct first arrivals, refraction first arrivals, and reflection events.

FIG. 2 illustrates schematically a CEP gather in the form of a common receiver gather. A common receiver gather as illustrated in FIG. 2 is a set of traces for a given receiver for a plurality of shots initiated at different positions along the seismic line relative to the receiver. Specifically FIG. 2 illustrates a near surface portion of a common receiver gather of traces. For illustration purposes, each trace t in FIG. 2 is illustrated with a first arrival event f and a reflection event r. It can be seen that the first arrivals f generally occur along a generally linear function represented by one of $m_1$ or $m_2$ whereas reflection events r generally occur along a generally hyperbolic function represented by h. The trace corresponding to zero offset is indicated at 0 and the other traces are designated $+1, +2, \ldots -1, -2, \ldots$ where the units are measures of source-receiver offset and where the $+$ or $-$ indicates relative location of a source and receiver along a seismic line.

In FIG. 2, some of the first arrivals f occur along a line of slop $m_1$ and represent direct first arrivals whereas others occur along a line of slope $m_2$ and represent refraction first arrivals. The source-receiver offset or traveltimes where lines of slope $m_1$ and $m_2$ cross is known as crossover distance cd or time respectively. See also FIG. 4.

As illustrated by dotted line rfa, at negative offsets greater than the critical distance cd, first arrivals represent refraction first arrivals. Of course, such refraction first arrivals also occur at positive offsets greater than the critical distance.

Referring again to FIG. 1, as illustrated by steps C, D, E, F, and G, the invention uses a refraction stack of CEP gathers to estimate intercept times and to determine datum corrections.

Figure 3:
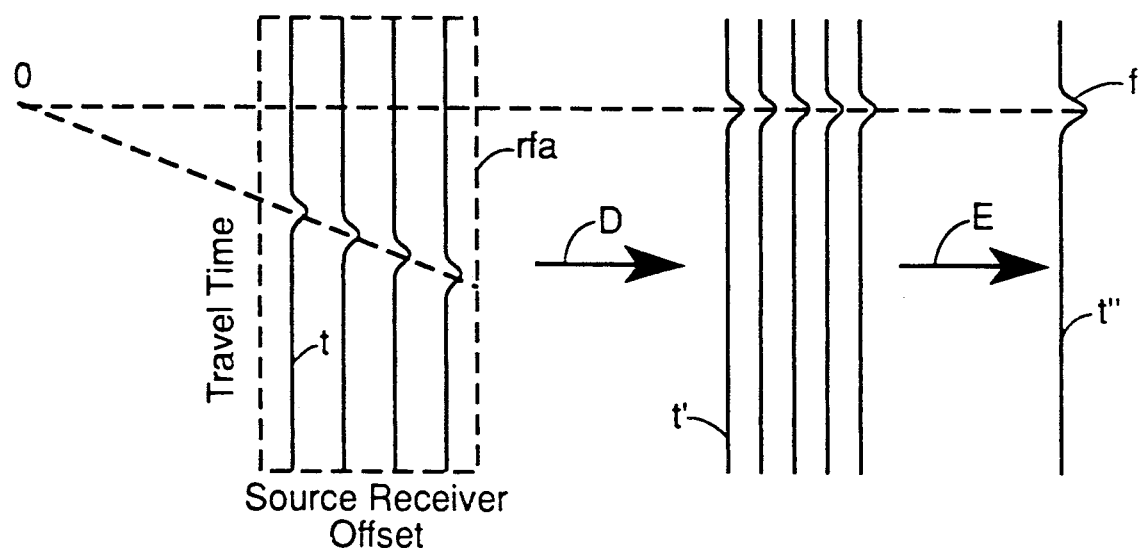
FIG. 3 illustrates schematically LMO correcting a CEP gather.

Referring now again to FIG. 2 and to FIG. 3, FIGS. 2 and 3 illustrate selecting near offset traces having offsets greater than the critical for generating a refraction stack.

Figure 10:
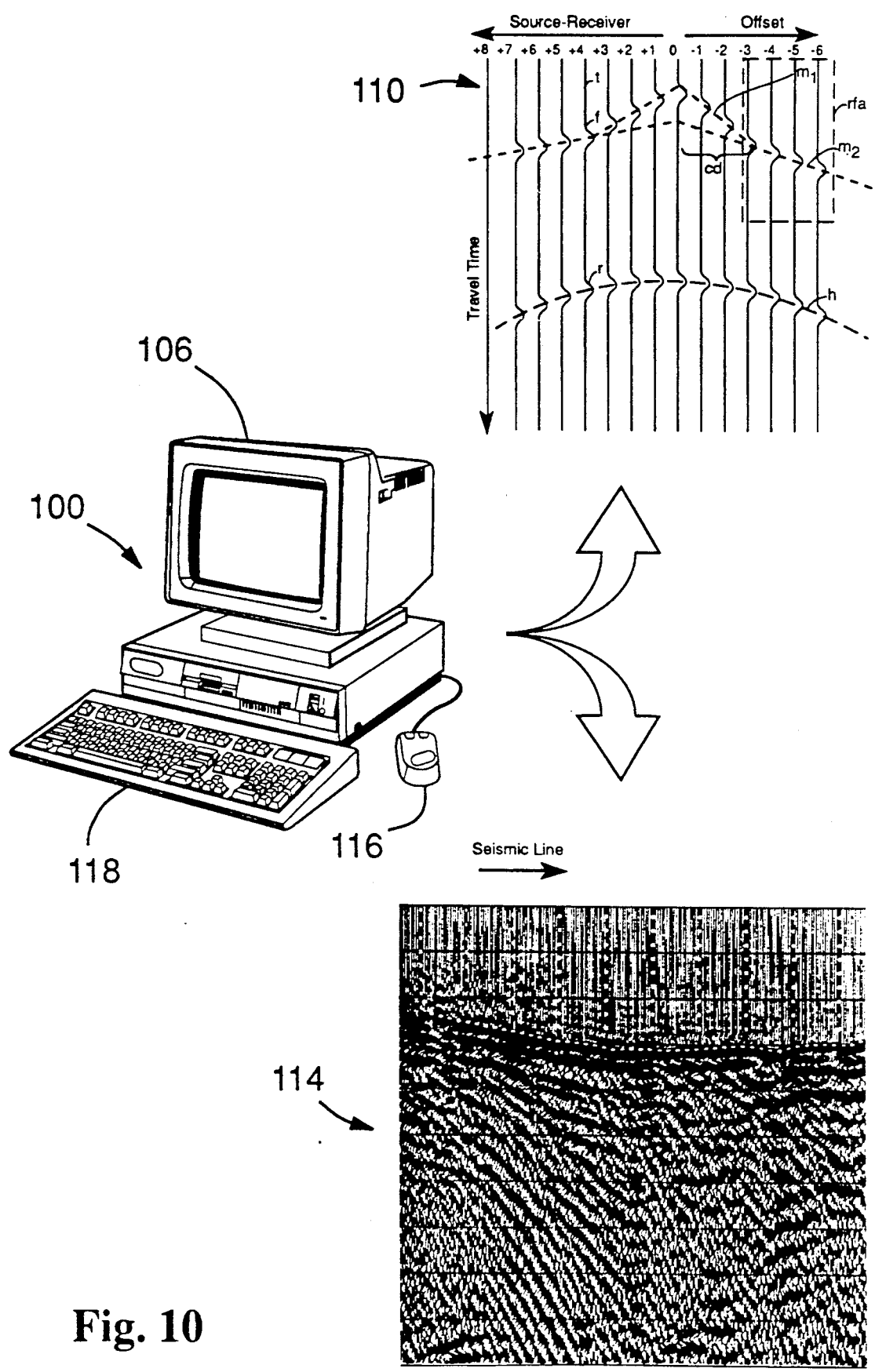
FIG. 10 illustrates apparatus for practicing the invention.

A set of seismic traces can be stored in memory of a computerized data processor, and can then be processed according to the invention and used to generate various displays. For example, the traces can be sorted into CEP gathers at various intervals along the seismic line and displayed as a CEP gather as illustrated by FIG. 2. If desired, for split spread acquired traces, the records can be first separated into positive and negative spread components. The explorationist can identify a range of offsets and traveltimes as illustrated by dashed line rfa in FIGS. 2 and 3 using, for example, a mouse 116 as shown in FIG. 10. Such steps can readily be implemented by a skilled geophysical applications programmer from the description herein.

Thus, in stacking selected traces of each of the common end-point gathers, each gather can be displayed on a computer monitor and a subset of traces can be selected by visual selection using, for example, a mouse, keyboard or other data input device to select the desired traces or range of traveltimes or both. Specifically, the user can pick a number of traces which show good refraction traces which are not in the near range that is close to source and distorted by various ground roll and other noise known to occur in near offset traces; and can optionally select a range of traveltimes which encompasses first arrivals.

Before analysis of seismic traces according to the invention begins, weathering velocity $V_0$ and refractor velocity $V_1$ is advantageously estimated. Such an estimate can be made for example, by sorting the traces into a CEP domain, for example, into common receiver gathers and then reviewing records along the profile and measuring slopes of direct and refracted first arrivals; that is, referring to FIG. 2, measuring slopes $m_1$ and $m_2$ respectively. Of course, this step can also use mouse 116 and an appropriately programmed computer as illustrated in FIG. 10. Other methods for estimating refractor velocities can also be used.

Referring again to FIG. 1, step D of the invention comprises linear moveout (LMO) correction of selected near offset traces. For example, referring to FIG. 2, an estimated refractor velocity can be determined as $1/m_2$ and, using the estimated refractor velocity, the traces can be moved out corrected with a linear (refractor) velocity correction so that each first refraction arrival occurs at the time it would have if the receiver were at zero offset. This step of generating an estimated refractor velocity and linear moveout correcting near offset traces having offsets greater than the crossover distance can be repeated as necessary or desired to determine an optimum refractor velocity (linear moveout correction).

Referring now to FIG. 3, this step is illustrated for traces within dashed line rfa representing refraction first arrivals. Thus in FIG. 3, each of the first arrivals of the traces within dashed lines rfa have been corrected by step D by a time determined by slope $m_2$ to yield traces t' having first arrival times corresponding to zero offset first arrival represented by intersection of lines and reference numeral zero $m_2$ on FIG. 2 and illustrated by the horizontal dashed line designated by reference numeral 0 in FIG. 3.

Then, by step E of FIG. 1 and FIG. 3, for each CEP gather of interest, a plurality (for example, ten) of the linear moveout corrected near traces can be stacked, i.e., summed over a time interval which encompasses refraction first arrivals to generate a refraction stack for that CEP. The use of ten traces are illustrative only and broadly any number of traces sufficient to give significant improvement of signal to noise ratio can be stacked. Preferably, enough traces are used to significantly improve signal to noise ratio but not so many as to unnecessarily increase data processing requirements. For example, 5–150, 5–50, or 5–15 traces can be used.

This step is illustrated by step E of FIG. 1 and FIG. 3 and the resulting stacked trace t" is referred to herein as a refraction stacked trace or refraction stack. The first arrival times f of each refraction stack thus represents the intercept time of common endpoint gather refraction first arrivals.

Figure 5:
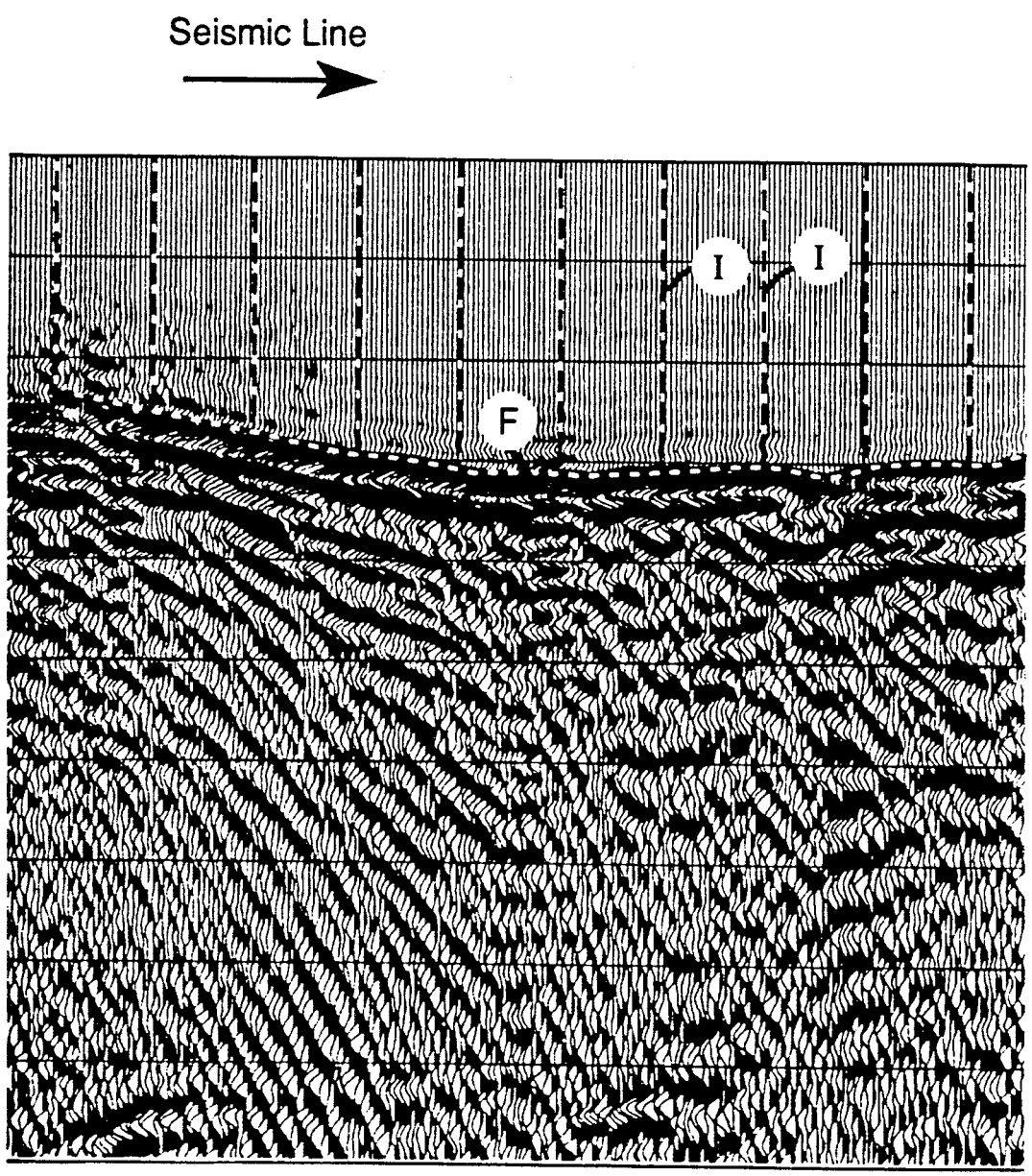
FIG. 5 illustrates schematically a portion of a refraction stack section or display along a seismic line of exploration.

As illustrated by step F of FIG. 1 and by FIG. 5, the resulting plurality of refraction stacks can be displayed as a function of shot or receiver location along the seismic line as a refraction stack section. Times corresponding to refraction first arrivals f on the refraction stack section illustrated by dashed line F can be used to determine intercept times as a function of location along the seismic line. The time can be picked along the section using mouse 116 of FIG. 10; or alternatively, an automatic picking function can be used to determine first intercept times along the seismic line. The intercept time can be determined for each refraction stacked trace or at intervals along the seismic line. For example, where the weathering layer is relative uniform intercept time every 5, 10 or more receiver or shotpoint locations will suffice as illustrated in FIG. 5 by dashed lines I.

Then from the intercept times thus determined for the weathering layer, a datum correction can be determined and used to correct the seismic traces down to a selected subsurface datum.

Referring again to FIG. 1, step G illustrates determining a datum correction for refraction stacked trace.

Figure 4:
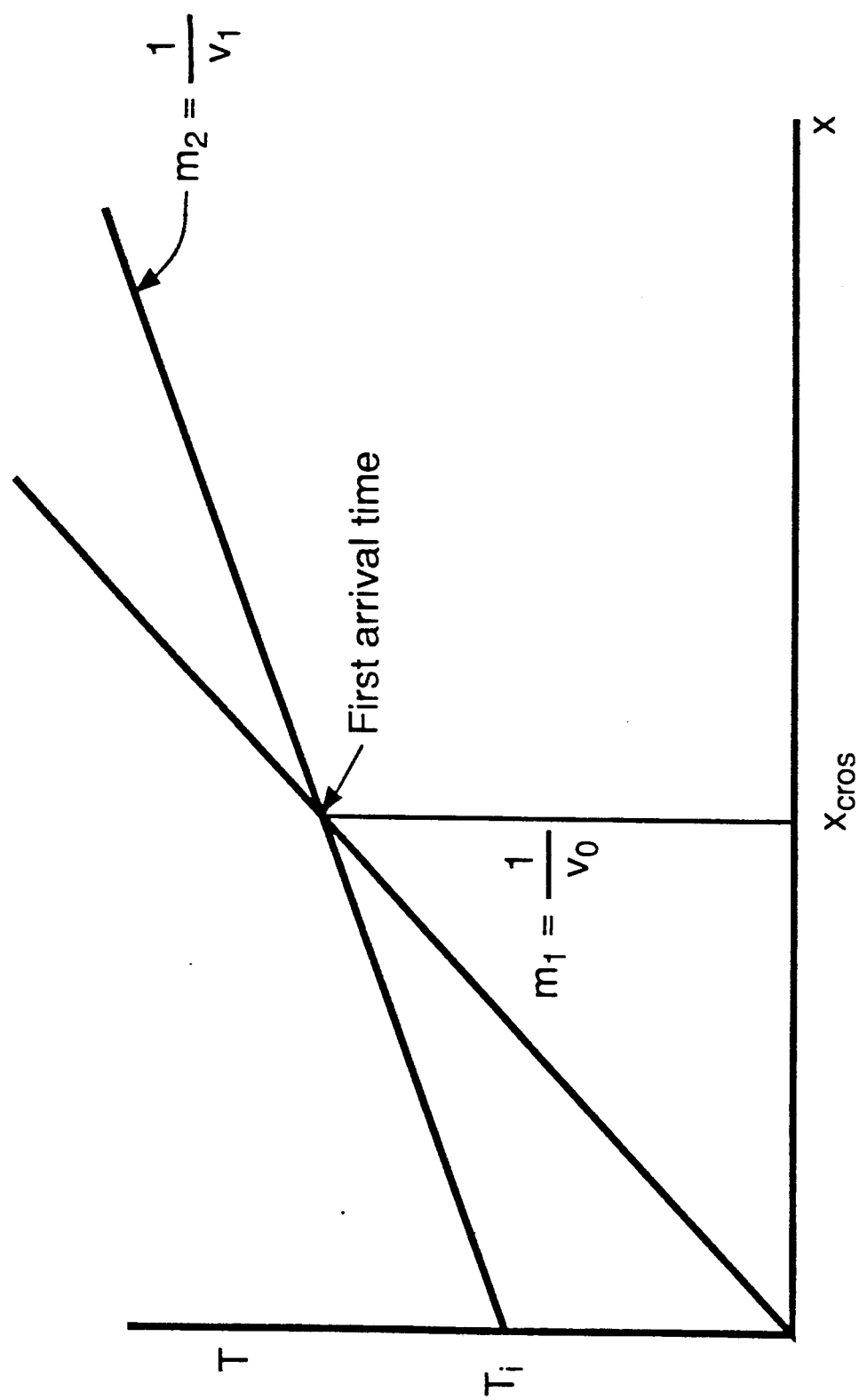
FIG. 4 illustrates schematically the relationship between direct first arrivals, refraction first arrivals, crossover distance, refractor (refraction layer) velocity and weathering layer velocity.

Referring now to FIG. 4, FIG. 4 illustrates as is well-known that the intercept time $T_i$ is the time obtained by extrapolating the refraction alignment of a refraction time distance (T, x) plot back to zero offset. The intercept time $T_i$ is defined by the following equation:

$$T_i = 2Z \frac{\sqrt{V_1^2 - V_0^2}}{V_1 V_0}$$

where
Z = depth to refractor R
$V_0$ = velocity in weathering layer, and
$V_1$ = velocity in refracting layer, i.e, below refractor R By rearranging the equation above, the depth to the refractor can easily be calculated:

$$Z = 1/2 \, T_i \frac{V_1 V_0}{\sqrt{V_1^2 - V_0^2}} \quad (1)$$

Using Z and a knowledge of weathering and refraction velocities, a time shift $T_s$ can be determined for time shifting the refraction stacked trace so that the weathering layer has in effect the refraction velocity. Time shifts effective for time shifting the refraction stack trace relative to a seismic datum plane can also be determined. Determining such time shifts for traces obtained by various acquisition techniques generally is well-known to those skilled in the art and requires no extensive description here.

Depth to refractor can thus be easily calculated across the entire profile and the entire profile can be time shifted to the seismic datum. See step H of FIG. 1.

Figure 6:
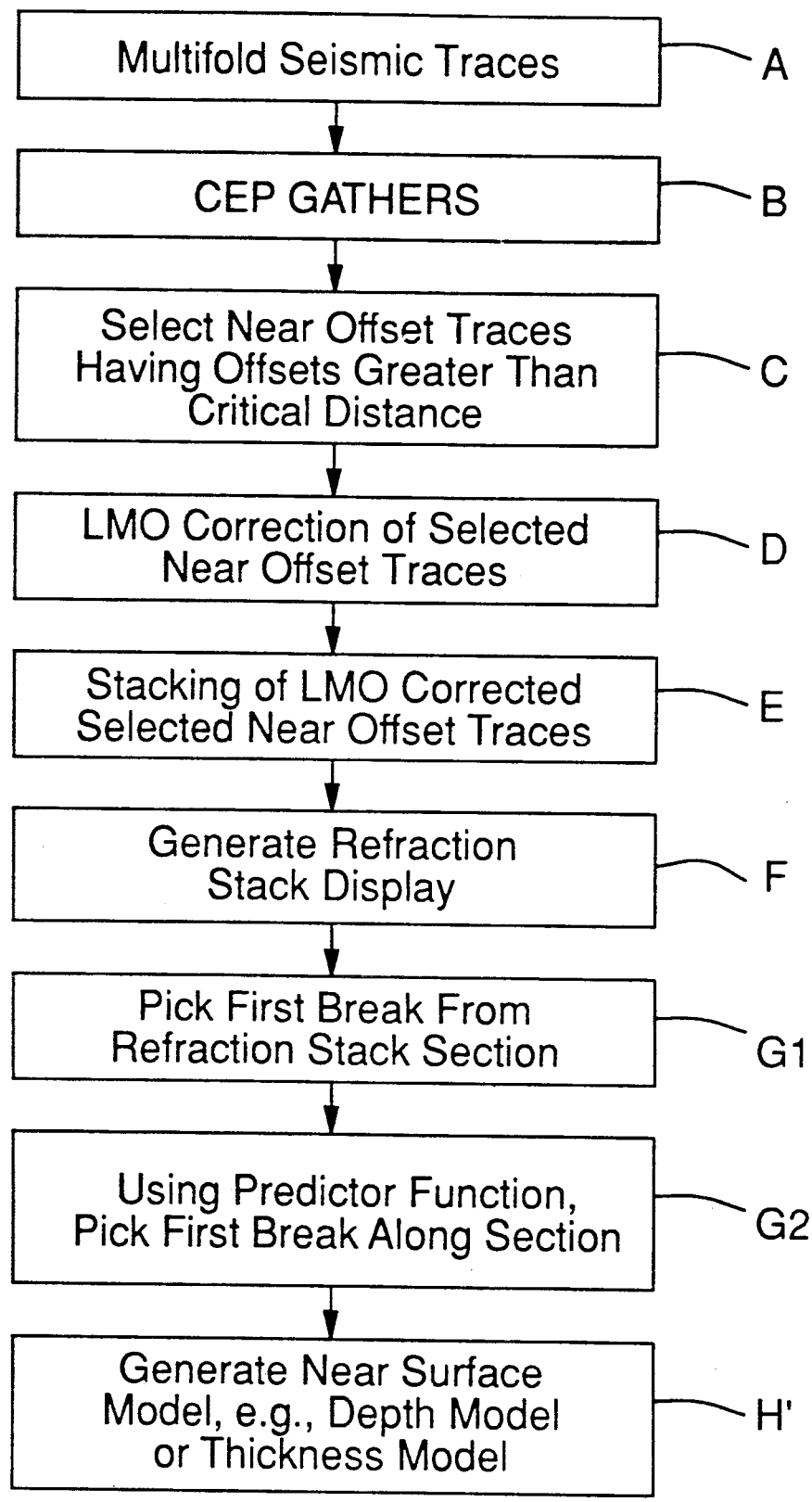
FIG. 6 illustrates a simplified flow chart of a second aspect of the invented method.

Referring now to FIG. 6, FIG. 6 illustrates an alternative embodiment of the invention in which a predictor function is used to pick first breaks along a refraction stack section for intercept time determination and datum correction.

As illustrated, steps A–F can be performed as described above for FIG. 1. Then, however, using mouse 116 as illustrated in FIG. 10, a first break can be selected from the display on the computer monitor (see display 114 in FIG. 10) and the computer can be programmed to pick first beaks along the entire seismic line using a predictor function.

It will be apparent that it may not suffice to merely specify a range of travel times if the first break picking is to be performed automatically by machine. Rather, a predictor function which changes in response to changes in a horizon, that is which "learns" from previously picked first arrival events, is advantageous.

Figure 7B:
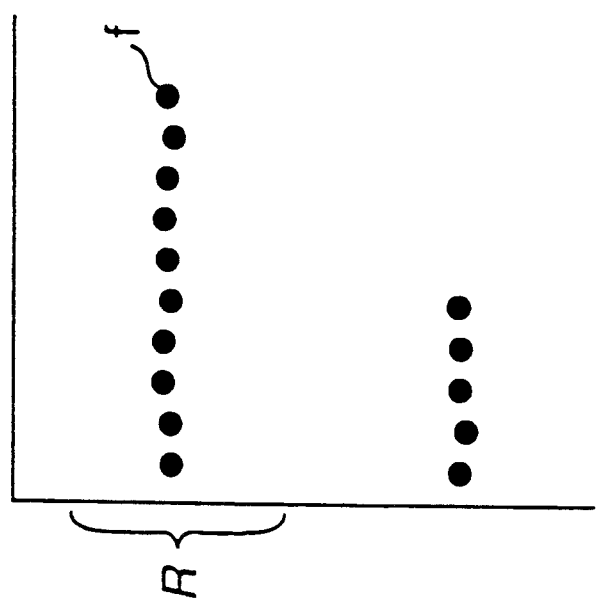
FIGS. 7A, and 7B illustrate picking first arrivals from a refraction stack section.
Figure 7A:
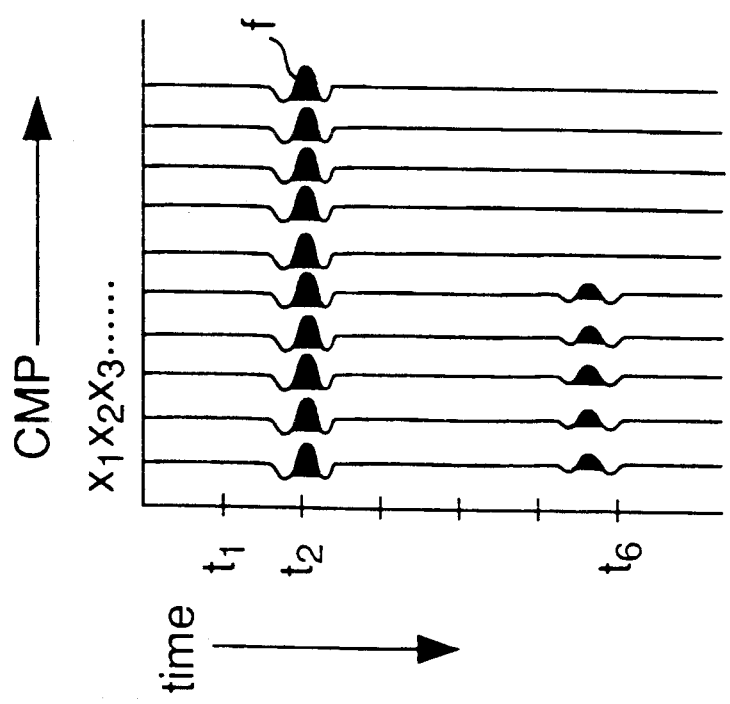
Figure 8:
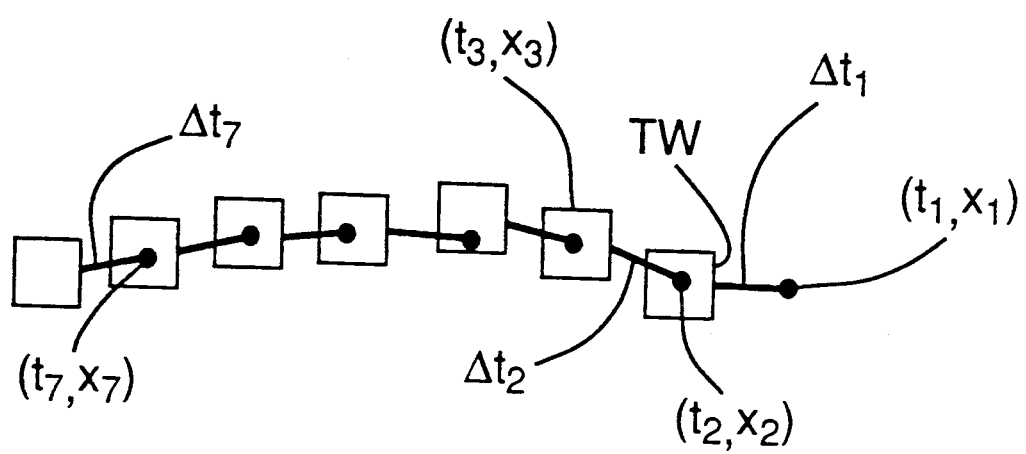
FIG. 8 illustrates a technique using a predictor function for picking first arrivals from a refraction stack section.

The principle of a procedure for picking first breaks is illustrated by FIGS. 7A and 7B in which first breaks f on adjacent refraction stacked traces in FIG. 7A are represented by dots in FIG. 7B and scanning proceeds from left to right as shown in FIG. 8. The explorationist can define a time interval or range R (see FIG. 7B) within which first breaks are known to occur and can further specify one or more first breaks using, for example, a mouse 116 of FIG. 10.

A predictor function can be provided by associating with first break a parameter representative of the expected change in travel time between first arrivals on adjacent refraction stack traces (expected time dip per refraction stack trace, symbolized $\Delta t$). If the travel time of a first break on an adjacent refraction stacked trace is within a time window TW i.e., $\pm$ a selected time interval relative to t of a first arrival event (t,x) previously picked, then the event on the adjacent refraction stacked trace can be picked as a first arrival.

Thus, referring to FIG. 8, first arrival $(t_1,x_1)$ has a $\Delta t$ function associated with it which determines the time window TW within which an event $(t_2, x_2)$ must occur on an adjacent refraction stacked trace for that event $(t_2, x_2)$ to be picked as a first arrival. It will be noted that arrival $(t_2,x_2)$, falls within but is not centered in TW, and that TW is determined by (centered on) the end point of $\Delta t$. TW thus constitutes an error or tolerance so that an adjacent trace is searched at a time location $t + \Delta t \pm TW$ for events which might be picked as first arrivals where t is the time of occurrence of a first arrival on a previously scanned refraction stack trace.

$\Delta t$ can be updated as each (t,x) pair corresponding to first arrival is picked by using the actual change in time $\delta t$ between first arrivals on two adjacent traces as the $\Delta t$ which determines the time window TW for the next adjacent refraction stacked trace. It will be appreciated, therefore, that there are two time dip functions for each picked first arrival, a predicted $\Delta t$ function and an actual $\delta t$ function. By using the actual $\delta t$ function for a previously picked first arrival (t,x) as the predicted $\Delta t$ for the next trace, the $\Delta t$ function "learns" from events previously picked as first arrivals. $\Delta t$ can be initially set by the user or by default programming specification and thereafter updated as indicated using the actual $\delta t$ value or, for example, updated as a running average of a selected number of $\delta t$ of preceding adjacent refraction stacked traces.

As illustrated in FIG. 8, no first arrival (a "null event") occurs in TW determined by $(t_7, \Delta t_7)$. It is preferred that some preselected number of null events on adjacent refraction stack traces be permitted before an error function or signal may be generated.

Figure 9:
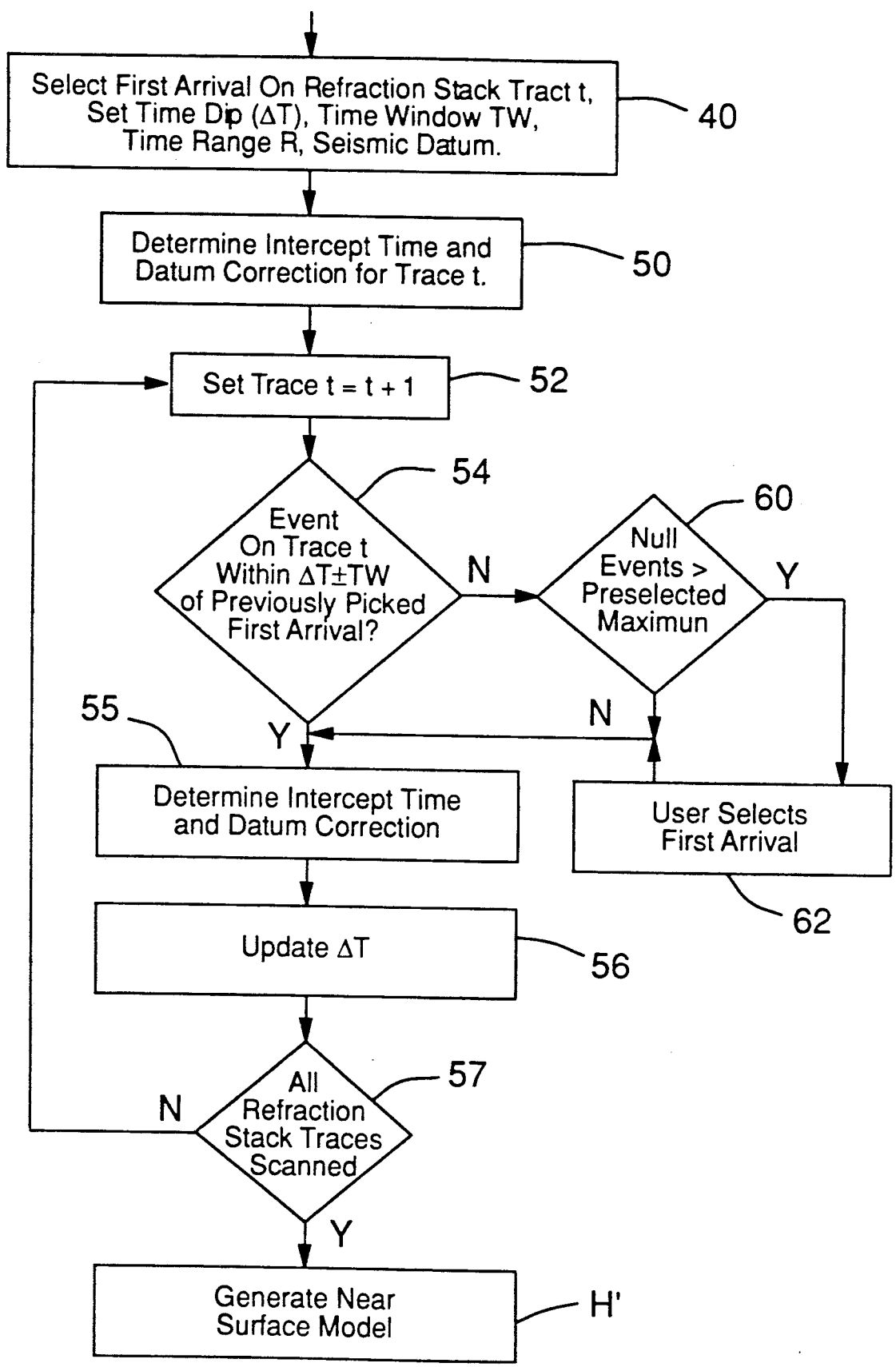
FIG. 9 illustrates schematically a simplified flow diagram for implementing a predictor function as in FIG. 8 on a computer.

Referring now to FIG. 9, FIG. 9 illustrates a procedure for automatically picking first arrivals from refraction stacked traces using a predictor function and for generating a near surface model.

As illustrated, at step 40, a predicted time dip $\Delta t$, a time window aperture TW and a time range within which refraction stack traces are scanned for first arrivals can be user or default programming specified. By step 50, a user can pick, for example, using a mouse, a first break on a selected refraction stacked trace. Then, as illustrated at step 52 a programmed data processor can determine intercept times and datum correction for the selected seismic datum.

Then, as illustrated by steps 52 and 54, the computer can scan the adjacent refraction stacked seismic trace for a first arrival within $t + \Delta t \pm TW$ of the previously picked first arrival. If an event occurs within the time window, then the intercept time and datum correction for that trace is determined by step 55 and $\Delta t$ is updated by step 56. By step 57, the programmed computer can evaluate whether all refraction stacked traces have been scanned for first arrivals. If not, by step 52 the next refraction stacked trace can be scanned for its first arrival event.

If null first arrival events occur on a refraction stacked trace, which may rarely happen, then step 60 can evaluate whether a preselected number of null events, i.e., adjacent non occurrences of first arrivals has been counted and generate an alarm or otherwise require user input for evaluating the situation, selecting a new first arrival for application of the predictor function, and the like. See, for example, step 62 of FIG. 9. Otherwise, the first arrival for the previous adjacent trace for which first arrival was picked can be used for steps 55 and 56.

After all first arrivals along a seismic line or an interval thereof have been selected and first intercept times and datum corrections determined, by step H', a near surface model of the earth corrected for weathering effects can be generated.

FIG. 10 illustrates apparatus 100 for geophysical exploration in accordance with the invention comprising means for generating displays such as displays 110 or 114 on monitor 106. The displays can be, for example, CEP gathers (display 110), refraction stacked trace sections (display 114), and the like.

According to various aspects of the invention, means functionally or positionally related to the coordinate system of a display can be used for selecting events from the various displays, for example, for selecting traces from CEP gathers for LMO correction and stacking, for selecting first arrivals from refraction stack section, for selecting a seismic datum, and the like, all of which can be readily accomplished by the skilled applications programmer in the seismic data processing arts from the descriptions herein. This means can be any means which can select points in a coordinate system of the display and then input such points to a data processor. The data processor can then generate first arrival intercept times, datum corrections and the like useful for producing near surface velocity model in accordance with the invention. Such means can include a keyboard such as 118 for directly inputting coordinates or for controlling a cursor on the display for translation by the computer into coordinates; or can include other means positionally related to a coordinate system of the display, such as a mouse 116, a trackball or a joystick; or can include means mapping a coordinate system for selection of points thereon corresponding to the points on a coordinate system of a display such as a digitizing tablet, and means such as light pens, touch sensitive screens, and the like.

EXAMPLE

The invented method is evaluated on a set of traces where the near surface is known to consist of a low velocity alluvium on top of a much higher velocity section. Inspection of the shot record indicates a weathering velocity of near 1,000 meters per second (mps) and a refractor velocity near 5,000 mps. Intercept times are picked from the refraction stack. Using Equation 1, the depths to the refractor are determined. As a quality control step, a second near surface model is generated by traditional refraction statics. The basic shape of the two models is very similar.

The invention provides an approach to solving the major problem of statics corrections: finding a long period statics solution without a major investment in time or computer processing requirements. The technique is proven effective and can potentially have a significant impact on all of seismic exploration.

What is claimed is:

1. A method of geophysical exploration comprising generating from seismic traces a near surface model of the earth having weathering effects removed by the steps of:
    (a) generating common end point (CEP) gathers of a set of seismic traces along a seismic line of exploration, the set of seismic traces having refraction first arrivals at source-receiver offsets greater than a crossover distance;
    (b) selecting a set of traces from each CEP gather having source-receiver offsets greater than the crossover distance, first arrivals in the selected traces thus representing refraction first arrivals;
    (c) generating for each selected set of traces a refraction stacked trace by linear moveout correcting each of the selected set of traces in each CEP gather so that each refraction first arrival occurs at a time it would have for a receiver at zero source-receiver offset;
    (d) stacking the resulting linear moveout corrected traces of each selected set of traces producing a refraction stacked trace for each selected set of traces; and
    (e) determining first break intercept times from the resulting refraction stacked traces and time shifting traces of the CEP gathers using thus determined first break intercept times effective for removing weathering effects therefrom and generating a near surface model of the earth along the seismic line of exploration from the sets of seismic traces having weathering effects removed.

2. The method of claim 1 wherein the set of traces selected for each CEP gather comprises in the range of 5 to 150 traces.

3. The method of claim 1 wherein the set of traces selected for each CEP gather comprises in the range of 5 to 50 traces.

4. The method of claim 1 wherein the set of traces selected for each CEP gather comprises in the range of 5 to 15 traces.

5. The method of claim 1 wherein the selected set of traces are stacked over only a near surface interval comprising first breaks of the traces.

6. The method of claim 5 wherein the selected set of traces are stacked over an interval comprising refraction first arrival times.

7. The method of claim 1 wherein refraction stacked traces are used for generating a refraction stacked trace section and first arrivals are selected along the seismic line of exploration from the refraction stacked trace section.

8. The method of claim 7 wherein the first arrivals are selected along the seismic line of exploration by an explorationist using a computer monitor and an interactive device for selecting the first arrivals.

9. The method of claim 7 wherein the first arrivals are selected along the seismic line of exploration by a computer implemented first arrival picking function.

10. The method of claim 1 wherein the fold of traces is at least 100 fold.

11. Apparatus for generating from seismic traces a near surface model of the earth having weathering effects removed comprising:
    (a) means for generating common end point (CEP) gathers of a set of seismic traces along a seismic line of exploration, the set of seismic traces having refraction first arrivals at source-receiver offsets greater than a crossover distance;
    (b) means for selecting a set of traces from each CEP gather having source-receiver offsets greater than the crossover distance, first arrivals within the selected traces thus representing refraction first arrivals;
    (c) means for generating for each selected set of traces a refraction stacked trace by linear moveout correcting the selected set of traces in each CEP gather so that each refraction first arrival occurs at a time it would have for a receiver at zero source-receiver offset and stacking the linear movement corrected traces; and
    (d) means for determining first break intercept times from the resulting refraction stacked traces and for time shifting traces of the CEP gathers using thus determined first break intercept times effective for removing weathering effects therefrom and for generating a near surface model of the earth having weathering effects removed.

12. The apparatus of claim 11 comprising means for selecting a set of traces for stacking over only a near surface interval comprising first arrival times of the traces.

13. The apparatus of claim 11 comprising means for selecting a set of traces for stacking over an interval comprising refraction first arrival times.

14. The apparatus of claim 11 comprising means for generating a refraction stacked trace section and means for selecting first arrivals along the seismic line of exploration from the refraction stacked trace section.

15. The method of claim 14 wherein the means for selecting first arrivals are selected along the seismic line of exploration comprises a computer implemented picking function.

* * * * *

UNITED STATES PATENT AND TRADEMARK OFFICE
CERTIFICATE OF CORRECTION

PATENT NO. : 5,073,876
DATED : December 17, 1991
INVENTOR(S) : Russell L. Propes It is certified that error appears in the above-indentified patent and that said Letters Patent is hereby corrected as shown below:

Column 4, line 38, "slop" should read -- slope--; line 55, insert "distance" after "critical".

Column 7, line 26, "$\Delta t$" should read --$\Delta t_1$--.

Column 10, line 36, --11(c), "movent" should be --moveout--.

Signed and Sealed this

Sixth Day of July, 1993

Attest:

MICHAEL K. KIRK

Attesting Officer

Acting Commissioner of Patents and Trademarks

UNITED STATES PATENT AND TRADEMARK OFFICE
CERTIFICATE OF CORRECTION

PATENT NO. : 5,073,876
DATED : December 17, 1991
INVENTOR(S) : Russell L. Propes It is certified that error appears in the above-identified patent and that said Letters Patent is hereby corrected as shown below:

| Col. | Line | |
|---|---|---|
| 5 | 47-48 | Should read --first arrival represented by intersection of lines $m_2$ and reference numeral zero on Fig. 2 and illustrated by--. |
| 6 | 67 | "beaks" should read --breaks--. |

Signed and Sealed this

Twenty-fourth Day of August, 1993

Attest:

BRUCE LEHMAN

*Attesting Officer*      *Commissioner of Patents and Trademarks*